(12) United States Patent
Sirkar

(10) Patent No.: US 7,318,854 B2
(45) Date of Patent: Jan. 15, 2008

(54) SYSTEM AND METHOD FOR SELECTIVE SEPARATION OF GASEOUS MIXTURES USING HOLLOW FIBERS

(75) Inventor: Kamalesh K. Sirkar, Bridgewater, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 256 days.

(21) Appl. No.: 10/976,611

(22) Filed: Oct. 29, 2004

(65) Prior Publication Data

US 2006/0090644 A1   May 4, 2006

(51) Int. Cl.
*B01D 53/22* (2006.01)
*B01D 53/04* (2006.01)

(52) U.S. Cl. .................. 95/45; 95/43; 95/44; 95/236; 96/5; 96/8; 96/10

(58) Field of Classification Search .............. 95/43, 95/44, 45, 51, 236; 96/5, 8, 10; 423/226
See application file for complete search history.

(56) References Cited

U.S. PATENT DOCUMENTS

| 4,117,079 | A | 9/1978 | Bellows | |
|---|---|---|---|---|
| 4,750,918 | A | 6/1988 | Sirkar | |
| 4,834,779 | A * | 5/1989 | Paganessi et al. | 95/44 |
| 4,954,145 | A | 9/1990 | Thakore et al. | |
| 4,973,434 | A | 11/1990 | Sirkar et al. | |
| 5,135,547 | A | 8/1992 | Tsou et al. | |
| 5,281,254 | A | 1/1994 | Birbara et al. | |
| 5,611,843 | A | 3/1997 | Ho | |
| 5,749,941 | A | 5/1998 | Jansen et al. | |
| 5,876,486 | A | 3/1999 | Steinwandel et al. | |
| 5,928,409 | A * | 7/1999 | Sirkar | 95/45 |
| 6,156,096 | A | 12/2000 | Sirkar | |
| 6,165,253 | A * | 12/2000 | Sirkar et al. | 95/51 |
| 6,485,650 | B1 | 11/2002 | Bhown | |
| 6,579,331 | B1 * | 6/2003 | Ho | 95/51 |
| 6,666,906 | B2 * | 12/2003 | Hallman | 95/44 |
| 6,958,085 | B1 * | 10/2005 | Parrish | 95/51 |
| 7,104,530 | B2 * | 9/2006 | Boye | 96/8 |
| 2003/0033932 | A1 * | 2/2003 | Sirkar et al. | 95/51 |
| 2003/0154857 | A1 | 8/2003 | Murdoch | |

OTHER PUBLICATIONS

PCT International Search Report dated Mar. 1, 2005.
H. Chen, et al., Selective $CO_2$ Separation from $CO_2$, $N_2$ Mixtures by Immobilized Carbonate—Glycerol Membranes, Ind. Eng. Chem. Res. 1999, vol. 38, pp. 3489-3498.
Meldon, et al., Facilitated Transport of Carbon Dioxide: A Review, Chemical Engineering Communication, 1982, vol. 16, pp. 263-300.

(Continued)

*Primary Examiner*—Jason M. Greene
(74) *Attorney, Agent, or Firm*—McCarter & English, LLP

(57) ABSTRACT

A system and method for separation of a gas, e.g., carbon dioxide, from a gaseous mixture using a hollow fiber membrane module. The module contains an absorbent solution that is effective in absorbing the gas for an extended period, e.g., eight hours, without regeneration or replacement. The absorbent solution is then regenerated by passing a sweep gas through the hollow fibers in the module. The separation system is particularly useful for fuel cell and battery applications.

23 Claims, 5 Drawing Sheets

OTHER PUBLICATIONS

Way, et al., Facilitated Transport, In Membrane Handbook, New Membrane Processes Under Development, 1992, Chapter 44, pp. 833-866.

Ward, III, et al., Carbon Dioxide-Oxygen Separation: Facilitated Transport of Carbon Dioxide Across A Liquid Film, http://www.jstor.org/, Mon. Feb. 13 14:49:16 2006.

Otto, et al., The Facilitated Transport of Carbon Dioxide Through Bicarbonate Solutions, Chemical Engineering Science, 1971, vol. 26, pp. 949-961.

Suchdeo, et al., The Permeability of Gases Through Reacting Solutions: The Carbon Dioxide-Bicarbonate Membrane System, Chemical Engineering Science, 1974, vol. 29, pp. 13-23.

LeBlanc, Jr., et al., Facilitated Transport In Ion-Exchange Membranes, Journal of Membrane Science, 1980, vol. 6, pp. 339-343.

Way, et al., Facilitated Transport of $CO_2$ In Ion Exchange Membranes, AIChE Journal, Mar. 1987, vol. 33, No. 3.

Teramoto, et al., Facilitated Transport of Carbon Dioxide Through Supported Liquid Membranes of Aqueous Amine Solutions, Ind. Eng. Chem. Res., 1996, vol. 35, pp. 538-545.

Guha, et al., Facilitated Transport of $CO_2$ Through an Immobilized Liquid Membrane of Aqueous Diethanolamine, Ind. Eng. Chem. Res., 1990, vol. 29, pp. 2093-2100.

Davis, et al., $CO_2$/ $CH_4$ Separation by Facilitated Transport in Amine-Polyethylene Glycol Mixtures, [Separations], AIChE Journal, Jul. 1993, vol. 39, No. 7, pp. 1135-1145.

Matsuyama, et al., Development of a New Functional Cation-Exchange Membrane and Its Application to Facilitated Transport of $CO_2$, Journal of Membrane Science, 1994, vol. 93, pp. 237-244.

Hughes, et al., Separation By Facilitated Transport Membranes, In Recent Developments in Separation Science, 1986, vol. IX, pp. 174-195.

Meldon, et al., Selective $CO_2$ Permeation In Immobilized Liquid Membranes, Industrial Membrane Processes, AIChE Symposium Series, 1986, No. 248, vol. 82, pp. 114-120.

Callahan, Novel Uses of Microporous Membranes: A Case Study, New Membranes and Processes for Separation, AIChE Symposium Series, No. 261, vol. 84, pp. 54-63.

Saha, et al., Selective $CO_2$ Separation From $CO_2$/$C_2H_6$ Mixtures by Immobilized Diethanolamine/PEG Membranes, Journal of Membrane Science, 1995, vol. 98, pp. 157-171.

Segur, et al., Viscosity of Glycerol and Its Aqueous Solutions, Industrial and Engineering Chemistry, Sep. 1951, vol. 43, No. 9, pp. 2117-2120.

Jeffreys, et al., The Effect of Glycine Additive on the Rate of Absorption of Carbon Dioxide In Sodium Carbonate Solutions, Trans. Inst. Chem. Eng., 1964, vol. 42, pp. T118-T125.

Chibowski, et al., Theory and Practice of Thin-Layer Wicking, Langmuir, 1993, vol. 9, pp. 330-340.

Bhave, et al., Gas Permeation and Separation by Aqueous Membranes Immobilized Across the Whole Thickness or In A Thin Section of Hydrophobic Microporous Celgard Films, Journal of Membrane Science, 1986, vol. 27, pp. 41-61.

Wise, et al., The Diffusion Coefficients of Ten Slightly Soluble Gases in Water at 10-60° C., Chemical Engineering Science, 1966, vol. 21, pp. 999-1010.

Calderbank, Physical Rate Processes in Industrial Fermentation, Trans. Inst. Chem. Eng., 1959, vol. 37, pp. 173-185.

Kreulen, et al., Microporous Hollow Fibre Membrane Modules as Gas-Liquid Contactors, Journal of Membrane Science, 1993, vol. 78, pp. 197-216.

Rischbleter, et al., Gas Solubilities in Aqueous Solutions of Organic Substances, Journal of Chmical Engineering Data, 1996, vol. 41, pp. 809-812.

Schumpe, The Estimation of Gas Solubilities in Salt Solutions, Chemical Engineering Science, 1993, vol. 48, pp. 153-158.

Hirayama, et al., Relation of Gas Permeability With Structure of Aromatic Polyimides I, Journal of Membrane Sciece, 1996, vol. 111, pp. 169-182.

Lehermeier, et al., Gas Permeation Properties of Poly(Lactic Acid), Journal of Membrane Science, 2001, vol. 190, pp. 243-251.

Yasuda, et al., Pore Size of Microporous Polymer Membranes, Journal of Applied Polymer Science, 1974, vol. 18, pp. 805-819.

Himmelblau, et al., Kinetic Studies of Carbonation Reactions Using Radioactive Tracers, AIChE Journal, Jun. 1958, vol. 4, pp. 143-152.

Pohorecki, et al., Kinetics of Reaction Between Carbon Dioxide and Hydroxylions in Aqueous Electrolyte Solutions, Chemical Engineering Science, 1988, vol. 43, pp. 1677-1684.

Danckwerts, et al., The Kinetics of Absorption of Carbon Dioxide into Neutral and Alkaline Solutions, Chemical Engineering Science [Genie Chimique], 1958, vol. 8, pp. 201-215.

Balej, Water Vapour Partial Pressures and Water Activities in Potassium and Sodium Hydroxide Solutions Over Wide Concentration and Temperature Ranges, Int. J. Hydrogen Energy, 1985, vol. 10, No. 4, pp. 233-243.

Ichiraku, et al., An Investigation of the High Gas Permeability of Poly (1-Trimethylsilyl-1-Propyne), Journal of Membrane Science, 1987, vol. 34, pp. 5-18.

Kovvali, et al., Carbon Dioxide Separation With Novel Solvents as Liquid Membranes, Ind. Eng. Chem. Res., 2002, vol. 41, pp. 2287-2295.

Chen, Immobilized Glycerol-Based Liquid Membranes in Hollow Fibers For Selective $CO_2$—$N_2$ Mixtures, Journal of Membrane Science, 2001, vol. 183, pp. 75-88.

Yoshihiro, et al., et al., Preparation of Asymmetric Polimide Hollow Fiber Membrane, The 1990 International Congress on Membranes and Membrane Processes, vol. 2, pp. 1025-1027.

Araki, Amino Acids (Survey), In Encyclopedia of Chemical Technology, 4th Edition, John Wiley & Sons, New York, 1992, vol. 2, p. 504.

Perry, et al., Perry's Chemical Engineers' Handbook, 6th Edition, McGraw-Hill Book Co., New York, 1984, vol. 3, p. 103.

Quartulli, O.J., et al., In Encyclopedia of Chemical Processing and Design, McKetta, J.J., Ed., Marcel Dekker, New York, 1977, vol. 3, pp. 273-276.

Paul, D.R., et al. (editors), Polymeric Gas Separation, CRC Press, 1994, pp. cover page, 155, 188, and 206.

Astarita, G., et al., Gas Treating With Chemical Solvents, Practice and Problems of Industrial Gas Testing, Table 1.2.2. Commercial Use of Different Types of Solvent Gas Treating Processes and Table 1.2.3. Common Alkaline Reagents Used in Chemical Solvents, 1983, pp. 8-9.

Kovvali, Immobilized Liquid Membranes For Facilitated Transport and Gas Separation [Abstract], May 2001, [Thesis Research; unpublished], 200 sheets.

Callahan, Novel Uses of Microporous Membranes: A Case Study, New Membranes and Processes for Separation, AIChE Symposium Series, No. 261, vol. 84, pp. 54-63, 1988.

* cited by examiner

SYSTEM AND METHOD FOR SELECTIVE SEPARATION OF GASEOUS MIXTURES USING HOLLOW FIBERS

BACKGROUND

1. Technical Field

The present disclosure is directed to systems and methods for separating one or more components from a gaseous mixture and, more particularly, to systems and methods for separating carbon dioxide from a gaseous system, e.g., atmospheric air, using hydrophobic porous/nonporous hollow fibers that are in contact with an absorbent solution. The present disclosure further relates to systems and methods for regenerating the absorbent solution on a periodic basis.

2. Background Art

Gas separation using facilitated transport membranes (FTMs) has been the subject of considerable research for many years. The types of FTMs investigated generally fall into the following three categories: (1) immobilized liquid membrane (ILM), (2) solvent-swollen polymer membrane, and (3) fixed-carrier membranes. Major advantages of FTMs over conventional polymeric membranes include enhanced selectivity and permeability for the target species because of reversible reactions between the carriers in FTM and the target species. This characteristic makes FTM especially attractive when the target species in the feed gas mixture exists in low concentrations because, to accomplish the separation and/or purification task, the limited transmembrane driving force is generally too small for conventional polymeric membranes.

Though generally considered to be the least stable FLM configuration, ILM has been widely investigated for facilitated transport of carbon dioxide using various carriers. Ward and Robb made a pioneering study on $CO_2$ permeation through a thin layer of carbonate/bicarbonate aqueous solution. Otto and Quinn and later Suchdeo and Schultz made theoretical analyses of $CO_2$ transport through carbonate/bicarbonate ILMs. [Each of the noted research efforts is identified in the list of References appended hereto.] Other investigators used amines as the carriers and/or ion-exchange membranes as the substrates. LeBlanc et al. and later Way et al. studied facilitated transport of $CO_2$ in ion-exchange membranes using various organic amine counterions. Teramoto et al. used monoethanolamine (MEA) solutions, while Guha et al. and Davis and Sandall used diethanolamine (DEA) solutions immobilized in porous substrates as ILMs to study $CO_2$ transport. Matsuyama et al. studied $CO_2$ transport through a plasma-polymerized ion-exchange substrate employing ethylenediamine (EDA) as the carrier.

Despite the attractive features of and extensive studies on ILMs for gas separation, commercial gas separation applications have been limited. Major work is still needed to improve the membrane permeances and demonstrate significantly longer operating life. In ILMs, the liquid solution is physically trapped in, but not chemically bonded to, the support matrix. The low stability can be a result of liquid washout and/or the evaporation of the liquids into the gas phases during operation. Various strategies have been employed to alleviate the problems of carrier loss and ILM drying out. Hughes et al. tried to circumvent the stability problem of an Ag+-containing ILM for olefin-paraffin separation by periodically regenerating it. A more common practice when aqueous solutions are used as the ILM fluid is to humidify both the feed and sweep gas streams simultaneously. Another alternative is to use low volatility and hygroscopic liquids, such as poly(ethylene glycol) (PEG) or glycerol as the major component in the ILM fluid.

Chen et al. have reported that hydrophilic poly(vinylidene fluoride) (PVDF)-based $Na_2CO_3$-glycerol ILMs are stable when challenged with feed streams of very low relative humidities (RH). Because of the relatively low carrier concentrations and high viscosity of the glycerol-based ILM fluid, the $Na_2CO_3$-glycerol ILM showed high $CO_2/N_2$ selectivities, but relatively low $CO_2$ permeances. The glycerol-based ILM could be useful for $CO_2$ removal from gas streams containing low concentrations of $CO_2$ if its $CO_2$ permeance were to be significantly increased.

Additional ILM-based work has been reported by Chen et al., in which efforts were aimed at developing a membrane for $CO_2$ separation from breathing mixtures for space-walk applications. Conventionally, this separation is done by adsorption/reaction using adsorbents/reagents discarded when saturated. Glycine-Na-glycerol and glycine-Na-carbonate-glycerol ILMs were investigated for $CO_2$ separation for spacesuit applications. As an amino acid salt, glycine-Na is environmentally friendly. Like other amines, glycinate ion forms labile complexes with carbon dioxide, but not with oxygen or nitrogen.

Spacesuit applications impose significant limitations on selection of ILM liquid and carrier species. Because the feed gas is normally not completely humidified (i.e., RH<100%), the ILM must be stable when the feed stream RH is relatively low. Also, to conserve oxygen, the membrane should have very high $CO_2/O_2$ selectivity (e.g., >2000) at low RHs. Moreover, the ILM components should be completely environmentally benign. Therefore, the most studied amines in the literature (e.g., MEA, DEA, and EDA) are not suitable for such application because of their relatively high volatilities and irritative nature.

Glycine has been used as an additive in carbonate/bicarbonate solutions for the selective removal of $CO_2$ from industrial gas streams. LeBlanc et al. demonstrated that glycine salt can be a better carrier species for $CO_2$ than carbonate in ion-exchange substrate-based ILMs. In addition, glycine salts have been incorporated into polymeric membranes for enhanced $CO_2$ separation from gas streams containing $CO_2$ and $H_2$. Ho disclosed a $CO_2$ separating polymeric membrane fabricated from poly(vinyl alcohol) and glycine salts (e.g., glycine-K and glycine-Li).

Kowali and Sirkar have explored the use of glycerol carbonate with added carriers as a liquid membrane for $CO_2$ separation. Glycerol with added carriers in the liquid membrane mode was also explored for $CO_2$ selective separation by Chen et al. In unpublished experiments, Kowali studied $CO_2$ absorption and desorption in one single module as a function of time. In addition, Chen et al. have studied the use of glycerol and/or glycerol carbonate with added carrier (sodium glycinate) as an absorbent solution, instead of using such materials in the liquid membrane mode.

Despite efforts to date, a need remains for systems and methods for effective gas separation and, in particular, for separation of carbon dioxide from atmospheric air. In addition, separation systems and methods are needed which may be effectively operated over extended periods, and which may be regenerated in an efficient manner.

SUMMARY OF THE DISCLOSURE

According to the present disclosure, advantageous systems and methods for separating one or more components from a gaseous mixture are provided. According to exemplary systems and methods of the present disclosure, carbon dioxide may be effectively separated from a gaseous system, e.g., atmospheric air, using hydrophobic porous/nonporous hollow fibers that are in contact with an absorbent solution. Systems and methods for regenerating the absorbent solution on a periodic basis so as to permit further separation cycles are also provided according to the present disclosure.

In an exemplary embodiment of the present disclosure, a hygroscopic nonvolatile $CO_2$-absorbent solution is placed in contact with hollow fibers. The hygroscopic solution typically consists of one or more chemically-reactive, reversible, non-volatile carbon dioxide absorbents in a non-volatile hygroscopic solution. The separation system generally includes hydrophobic porous/non-porous hollow fibers. The gaseous mixture is generally heated and moist/humidified, and is advantageously fed through the hollow fibers. As the moist gaseous mixture passes through the hollow fibers, carbon dioxide is absorbed by the hygroscopic solution, i.e., the carbon dioxide passes through the hollow fibers and is selectively absorbed by the hygroscopic solution.

After a period of operation, e.g., eight hours, the hygroscopic solution is advantageously regenerated by passing a sweep gas through the hollow fibers. The sweep gas is typically heated and dry, thereby facilitating effective carbon dioxide desorption from the hygroscopic solution. The gas, e.g., carbon dioxide, previously absorbed by the hygroscopic solution is absorbed by the sweep gas, thereby regenerating the absorbent solution so that such solution may be used for subsequent absorption cycles. Indeed, the disclosed systems and methods provide an effective means for removal of a gas, e.g., carbon dioxide, from atmospheric air on a cyclic basis.

Additional advantageous features and functions associated with the disclosed systems and methods will be apparent from the detailed description which follows.

BRIEF DESCRIPTION OF THE FIGURES

So that those having ordinary skill in the art will have a better understanding of how to make and use the disclosed systems and methods, reference is made to the accompanying figures wherein.

DESCRIPTION OF EXEMPLARY EMBODIMENTS

Figure 1:
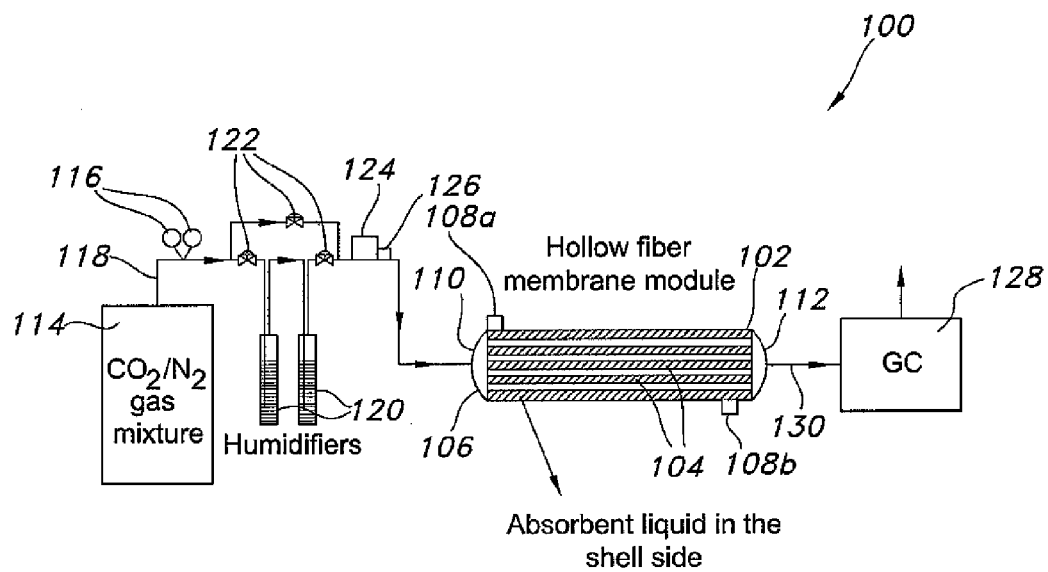
FIG. 1 is a schematic diagram of a system for gas separation according to an exemplary embodiment of the present disclosure.

The present disclosure provides advantageous systems and methods for separating one or more gaseous components/molecules from a gaseous mixture. The disclosed systems and methods are particularly advantageous for separating carbon dioxide from a gaseous system, e.g., atmospheric air. According to exemplary embodiments of the present disclosure, hydrophobic porous/nonporous hollow fibers are placed in contact with an absorbent solution and a gaseous mixture is passed through the hollow fibers. The absorbent solution advantageously absorbs the desired component or components from the gaseous mixture, e.g., $CO_2$, for an extended period of time. Thereafter, the absorbent solution is regenerated on a periodic basis, e.g., using a sweep gas that is passed through the hollow fibers.

The systems and methods of the present disclosure are susceptible to many commercial and/or industrial applications. For example, the systems and methods described herein for separating a gas or gases from a gas mixture have significant utility in the battery and fuel cell fields. Indeed, applications for effectively and efficiently scrubbing or removing gas/gases from a gas mixture are innumerable, particularly where regeneration and/or replacement of an absorbent solution is avoided/unnecessary for extended periods. Thus, the disclosed systems and methods are to be understood to find applicability in all gas separation applications wherein it is desired to remove a gas (or gases) from a gas mixture over an extended period (e.g., multiple hours), and to subsequently regenerate the absorbent solution employed in such separation process for effective reuse.

Although the present disclosure is described, at least in part, with reference to separation of carbon dioxide from atmospheric air, the present disclosure is not limited to such applications. Rather, the systems and methods of the present disclosure may be advantageously employed to separate a wide range of gaseous components/molecules from gaseous systems, as will be readily apparent to persons skilled in the art. Accordingly, the descriptions herein which relate to carbon dioxide-based applications are to be understood as being merely illustrative of the present disclosure, rather than limiting thereof.

Atmospheric air generally includes carbon dioxide at levels of about 350 ppm. In a variety of applications, substantial reductions in carbon dioxide levels are desired and/or required. In certain applications, it may be desired to reduce the presence of carbon dioxide to levels of 5 ppm, 50 ppm, 100 ppm or the like. For example, Zn-air batteries generally exhibit enhanced operation when the carbon dioxide level in the air is at or approaches zero. Similarly, alkaline fuel cells generally exhibit enhanced performance when operated in gaseous environments that are substantially devoid of carbon dioxide. These are two exemplary applications wherein substantially reduced carbon dioxide levels offer advantages for system operation, although numerous additional examples exist and are being identified from time-to-time on an ongoing basis.

According to the present disclosure, systems and methods are provided for separating one or more gaseous components/molecules from a gaseous system. With reference to FIG. 1, an exemplary system 100 for achieving such separation is schematically depicted. System 100 includes a hollow fiber membrane module 102 that houses a plurality of hollow fiber membranes 104. The hollow fiber membranes 104 are generally aligned with the longitudinal axis of module 102, although alternative geometric configurations may be employed. Module 102 is typically defined by an outer housing 106 that serves to confine the hollow fiber membranes 104 within module 102 and to maintain an absorbent solution on the shell side of the fibers. Input and output ports 108a, 108b are generally provided for facilitating introduction and withdrawal of an absorbent solution from module 102.

Gas flow is generally introduced to hollow fiber membrane module 102 at a first end 110 thereof. Gas flow exits module 102 at a second end 112 which is generally opposite first end 110. A gas supply 114 is generally provided upstream of hollow fiber membrane module 102. In the exemplary embodiment of FIG. 1, gas supply 114 takes the form of a canister containing a $CO_2/N_2$ gas mixture. However, hollow fiber membrane modules of the present disclosure may be employed with gas feed streams that originate from a variety of sources and that constitute/comprise various gaseous components, as will be apparent to persons skilled in the art. Pressure gauge(s) 116 are typically positioned with respect to gas flow line 118, thereby permitting real time monitoring of gas pressure at the feed side of system 100.

Humidifier(s) 120 are advantageously associated with feed line 118, thereby permitting the humidification of the gas flow from gas supply 114. According to an exemplary embodiment of the present disclosure, a plurality of humidifiers 120 are provided in series in system 100. In the schematically depicted embodiment of FIG. 1, a pair of humidifiers 120 are piped in series, thereby enhancing humidification of the gas flow. Valving 122 is typically provided to permit routing of the gas flow relative to humidifiers 120, e.g., to permit bypassing of humidifiers (in whole or in part), as may be desired in connection with operation of system 100. A controller 124 and/or a mass flow transducer 126 may also be included in feed line 118 to control and/or measure the gas flow rate through gas line 118 and into module 102.

As noted above, the gas feed is introduced to module 102 at first end 110. The gas flow is distributed to individual hollow fibers 104 that are positioned within outer housing 106. The hollow fibers 104 may be fabricated from various materials, although in exemplary embodiments of the present disclosure hollow fibers 104 are fabricated from polypropylene, e.g., microporous, hydrophobic polypropylene. The geometric properties and characteristics of hollow fibers 104 are generally selected to provide desired absorption levels into the absorption solution that surrounds the hollow fibers 104 within housing 106. According to an exemplary embodiment of the present disclosure, hollow fibers 104 constituted microporous, hydrophobic polypropylene fibers of 17 cm length, an inner diameter (ID) of 240 μm and an outer diameter (OD) of 300 μm. The present disclosure is not limited to such exemplary hollow fibers, but is merely illustrated thereby.

To facilitate measurement of the performance of module 102 for gaseous separation, the system 100 that is schematically depicted in FIG. 1 includes a gas chromatograph 128 associated with egress line 130 that exits from the second end 112 of module 102. Although gas chromatograph 128 is shown "in line" with egress line 130, such arrangement is not required according to the present disclosure. Rather, gas component levels in the gas egress from module 102 may be measured through periodic sampling, as desired, or may be presumed to meet desired levels based on the design and operation of system 100, as will be readily apparent to persons skilled in the art.

The absorbent solution for use in membrane module 102 is selected to provide absorption properties relative to the gas/gases that is/are to be separated from the gas mixture fed to module 102. Exemplary absorption solutions for use according to the present disclosure include glycerol and/or glycerol carbonate. A reactive carrier may be added to the foregoing solution(s), e.g., sodium glycinate, lithium glycinate, potassium glycinate, and the like, to increase the solution's absorption properties. The reactive carrier/absorption solution may further include water, e.g., if the combination of the reactive carrier and the absorption solution exhibit, in whole or in part, the characteristics of a suspension. Additional absorbent materials for use according to the present disclosure include polyamidoamine (PAMAM) dendrimers of generation zero. Dendrimers are structurally controlled macromolecules that are highly branched polymers composed of treelike dendrons emanating from a central core. Dendrimer structure is generally characterized by the number of generations (g), functionality of the branching points (f), and the length of the chain units between them. Regardless of the absorbent solution utilized according to the present disclosure, the absorbent solution is generally packed in the shell side of the module without air gaps to create a stable, immobilized absorbent-gas interface at each pore mouth of the hollow fiber membrane.

According to the present disclosure, an absorbent solution is introduced to a module that contains hollow fiber membranes, e.g., exemplary hollow fiber membrane module 102 schematically depicted in FIG. 1. The absorbent solution contacts the outer shell of the hollow fibers positioned within the module, e.g., hollow fibers 104 schematically depicted in FIG. 1. A gaseous mixture is introduced to the module and flows through the hollow fibers. Typically, the gaseous mixture is humidified before introduction to the module. The absorption solution is effective in absorbing desired gas/gases from the gaseous mixture, such gas molecules passing through the pores of the hollow fiber membranes for absorption by the absorption solution. Of note, the separation system of the present disclosure has been found to operate effectively for extended periods, e.g., for periods extending up to eight hours without intervening regeneration of the absorption solution. Such advantageous performance, e.g., for separation of carbon dioxide from a $CO_2/N_2$ gas mixture, is highly desirable and surprising in view of prior art teachings.

Additional features, functions and advantageous results achieved according to the systems and methods of the present disclosure will be apparent from the illustrative experimental results described hereinafter.

Experimental Studies

Experimental studies have been carried out with an exemplary hollow fiber membrane module of the type schematically depicted in FIG. 1. The experimental studies were aimed, inter alia, at establishing the feasibility of treating 5000 liter/hr of air for a period of eight (8) hours to reduce the $CO_2$ content of the air feed stream from 350 ppm to 100 ppm. As described herein, unsteady state experiments for absorption and desorption of $CO_2$ were carried out using different absorbent solutions. Absorption characteristics of different exemplary absorbent solutions and the effect of moisture content of the feed gas on the performance of the disclosed separation system were studied and are described herein.

Experimental Details

All experiments were carried out in a hollow fiber membrane module, having forty (40) Celgard X-10 microporous, hydrophobic polypropylene fibers of seventeen (17) cm length, an inner diameter (ID) of 240 μm and an outer diameter (OD) of 300 μm. An experimental setup which substantially corresponds to the system that is schematically depicted in FIG. 1 was employed for these experimental studies. Feed gas was humidified by passing through two humidifiers connected in series; the flow rate of the feed gas was controlled by a mass flow meter. The extent of humidification of the feed was altered by changing the number of humidifiers through which the gas was passed. Feed gas was always passed through the tube side of the membrane module, while the shell side of the module was filled with absorbent liquid. Various solutions of glycerol, glycerol carbonate and water containing different amounts of sodium glycinate were prepared for use as the absorbent solution and tested in the module.

The experimental procedure proceeded as follows:
(i) A $CO_2$-containing $N_2$ stream having an appropriate humidity level was continuously passed through the lumen side of the hollow fiber module.
(ii) The $CO_2$% composition in the outgoing gas was monitored over time.
(iii) After a period of eight (8) hours, $CO_2$ desorption/regeneration experiments were implemented. The desorption/regeneration experiments involved passing dry $N_2$ gas through the fiber lumen. [Nitrogen gas was used for desorption/regeneration, although other sweep gases may be employed, e.g., hot air, if desired.]
(iv) After $CO_2$ desorption/regeneration was carried out for a few hours, the absorption cycle was again initiated.

The absorbent solutions tested were the following:
Glycerol carbonate;
Solution of 0.5 M sodium glycinate in glycerol carbonate and water (1:1);
Solution of 1.0 M sodium glycinate in glycerol carbonate and water (1:1);
Solution of 0.833 M sodium glycinate in glycerol carbonate and water (8:2);
Solution of 0.833 M sodium glycinate in glycerol carbonate, glycerol and water (7:1:2)
Solution of 1.5 M sodium glycinate in glycerol carbonate, glycerol and water (5.5:2.5:2)
Solution of 3 M sodium glycinate in glycerol.

Materials, Chemicals and Equipment

The materials, chemicals and equipment used for the experiments are listed below:
Celgard X-10 microporous hydrophobic polypropylene hollow fibers (Celgard, Inc., Charlotte, N.C.)
Glycerol carbonate (Huntsman Corp., Houston, Tex.)
Glycerol (Sigma Chemical Co., St. Louis, Mo.)
Sodium glycinate (Sigma Chemical Co., St. Louis, Mo.)
Nitrogen (zero), Certified Standard (Welco-CGI Gas Technologies, Newark, N.J.)
5% $CO_2$ gas mixture (Nitrogen Balance), Certified Standard (Welco-CGI Gas Technologies, Newark, N.J.)
350 ppm $CO_2$ gas mixture (Nitrogen Balance), Certified Standard (Welco-CGI Gas Technologies, Newark, N.J.)
Multiple Flow Controller (Model 8274, Matheson, E. Rutherford, NJ)
Mass Flow Transducer (Model 8274, Matheson, E. Rutherford, NJ)
Gas Chromatograph (Model 5890, Series II, Hewlett Packard)
Integrator (Model 3396, Series II, Hewlett Packard)
Humidity Indicator (HMP 32 UT, Vaisala, Helsinki, Finland)
Humidity Probe (HMI 32, Vaisala, Helsinki, Finland).

Experimental Results and Discussion

In the case of glycerol carbonate, to increase its absorption characteristics, the reactive carrier sodium glycinate was added. Since the prepared 1M sodium glycinate solution in glycerol carbonate turned out to be a suspension, water was added in a 1:1 volume ratio. In addition, a 0.5 M sodium glycinate solution in glycerol carbonate and water was tested as an absorbent solution and its absorption characteristics were studied using a completely humidified feed containing 5 vol % of $CO_2$ (95% $N_2$). The absorption behaviors of these systems were compared with that of pure glycerol carbonate as the absorbent (see FIG. 2).

Figure 2:
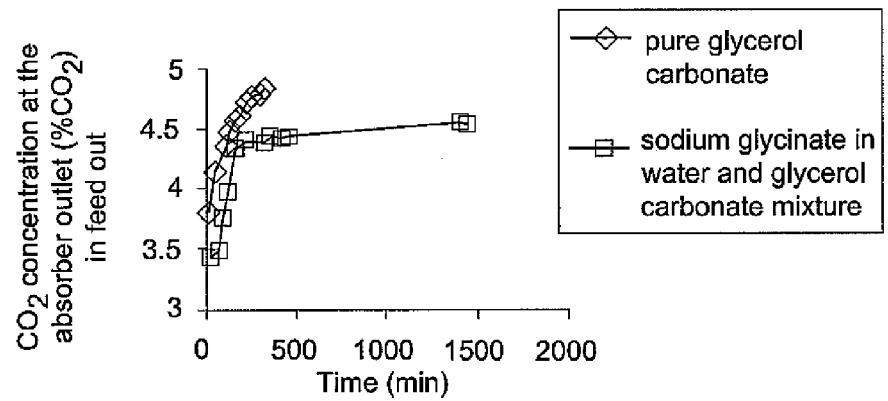
FIG. 2 is a plot that shows the absorption behavior of $CO_2$ in pure glycerol carbonate and 0.5 M sodium glycinate in a water and glycerol carbonate mixture with a completely humidified feed according to an exemplary embodiment of the present disclosure.
Figure 3:
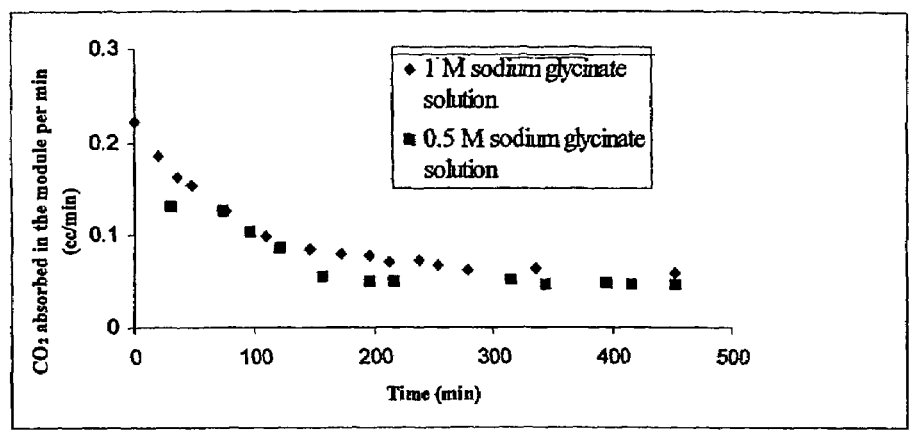
FIG. 3 is a plot that shows the absorption behavior of $CO_2$ absorbed in an exemplary hollow fiber module with a completely humidified feed according to the present disclosure for 1 M sodium glycinate and 0.5 M sodium glycinate absorbent solutions.

From the comparison in FIG. 2, it is noted that the addition of sodium glycinate to glycerol carbonate advantageously increases the absorption capacity of glycerol carbonate; hence, the concentration of carrier in the absorbent solution was increased to 1.0 M from 0.5M. Unsteady state experiments were carried out using 1 M sodium glycinate solution of glycerol carbonate and water under the same feed conditions. FIG. 3 compares the amount of $CO_2$ absorbed in the hollow fiber module per min by 0.5 M and 1.0 M sodium glycinate solutions in glycerol carbonate plus water. Based on this experimental work, only a limited increase in the absorption capacity of the absorbent was observed when the carrier concentration was doubled.

Figure 4:
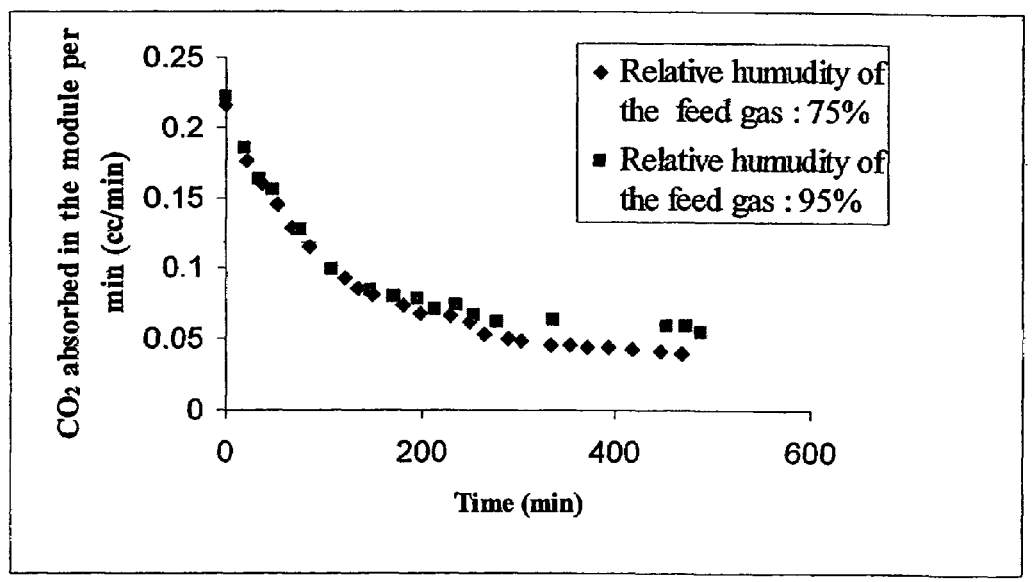
FIG. 4 is a plot that shows absorption behavior of $CO_2$ for feed gas humidities of 75% and 95% according to an exemplary embodiment of the present disclosure.

The presence of moisture is known to influence the reaction of $CO_2$ with a carrier (e.g., sodium glycinate). In view of the potential influence of moisture, the effect of humidity level of the feed gas on $CO_2$ absorption was studied for one of the foregoing absorbent solutions (i.e., a solution of 1 M sodium glycinate in glycerol carbonate plus water (1:1)). Part of the experimental setup was modified so as to facilitate relativity humidity adjustments of the feed gas to 75%. Unsteady state absorption characteristics of the absorbent solution were studied using a feed gas at 75% relative humidity containing 5% $CO_2$ in nitrogen (balance), and compared with that of a feed gas at 95% relative humidity. The comparative results are shown in the plot of FIG. 4. After a period of about three and half hours, a significant decrease in $CO_2$ absorption was observed for the 75% relative humidity feed gas as compared to the 95% relative humidity feed gas.

Since the presence of water in the absorbent solution could result in loss of water from the absorbent solution during the stripping process, experiments were carried out to minimize the water content in the absorbent solution. It was observed that a 20% water level in a glycerol carbonate solution with a total sodium glycinate concentration of 0.833 M forms a stable solution and hence can be effectively employed as the absorbent solution according to the present disclosure.

Figure 5:
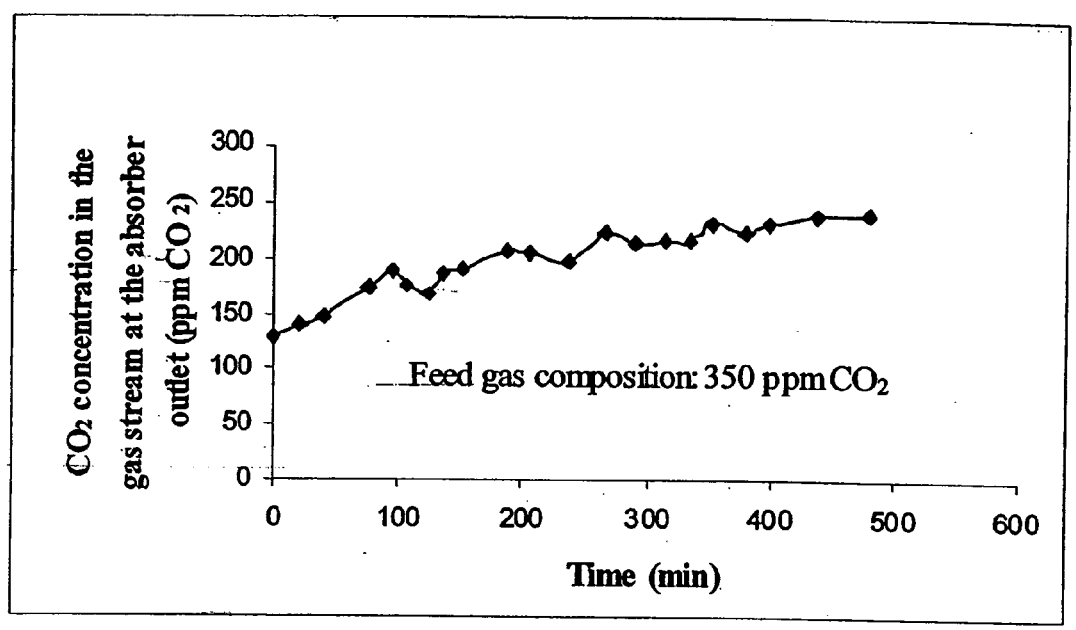
FIG. 5 is a plot of $CO_2$ concentration in the gas stream at an absorber outlet according to an exemplary embodiment of the present disclosure.

Unsteady state absorption characteristics of the foregoing absorbent solution were studied using feed gas at 75% relative humidity containing $CO_2$ at a 350 ppm level in nitrogen (balance) for a period of eight hours at a constant flow rate of 8.33 cc/min. The carbon dioxide concentration in the gas stream at the absorber outlet (i.e., second side 112 as schematically depicted in FIG. 1) vs. time is shown in the plot of FIG. 5. Of note, during the initial period of the experiment (i.e., at the initial data point), the $CO_2$ concentration in the effluent stream was reduced to 130 ppm; thereafter, after operating the system for an uninterrupted period of eight (8) hours (i.e., 480 mins.), the effluent concentration showed a $CO_2$ concentration of 240 ppm. Thus, while system performance degraded to some degree over the eight (8) hour period of operation, substantial $CO_2$ removal was nonetheless still achieved after operations of eight (8) hours (without intervening regeneration and/or replacement of the absorption solution).

After carrying out the absorption process (i.e., after continuous operations for eight hours), immediate desorption of the $CO_2$ from the absorbent solution was carried out by passing $N_2$ (dry) through the hollow fiber module for a period of twelve (12) hours at a rate of 20 cc/min. After the desorption step, $CO_2$ absorption characteristics of the regenerated absorbent solution was again studied. It was observed that the concentration of $CO_2$ in the effluent gas stream was initially 152 ppm; and that the $CO_2$ concentration increased to 252 ppm in the effluent gas over the course of the eight (8) hour experimental run. These values show that there was a small difference in the amount of $CO_2$ absorbed between the first and the second absorption steps (i.e., before and after absorption solution regeneration).

The presence of glycerol in the absorbent solution can function to retain moisture more effectively and can therefore increase the absorption capacity of an absorbent solution. Based on the properties generally associated with glycerol-containing systems, an absorbent solution having 10 vol % glycerol and 20 vol % water in glycerol carbonate, such solution also having a total sodium glycinate concentration of 0.83 M, was prepared and tested in the separation system described above. Successive and repetitive absorption and desorption experiments were carried out with the foregoing absorbent solution using air that initially contained 350 ppm of $CO_2$ as the feed gas and $N_2$ as the stripping gas. The absorption step was carried out by passing feed gas at a constant flow rate of 8.3 cc/min for eight (8) hours, followed by an immediate desorption step, in which $N_2$ was passed through the hollow fibers for a period of twelve (12) hours at a constant rate of 20 cc/min.

Figure 6:
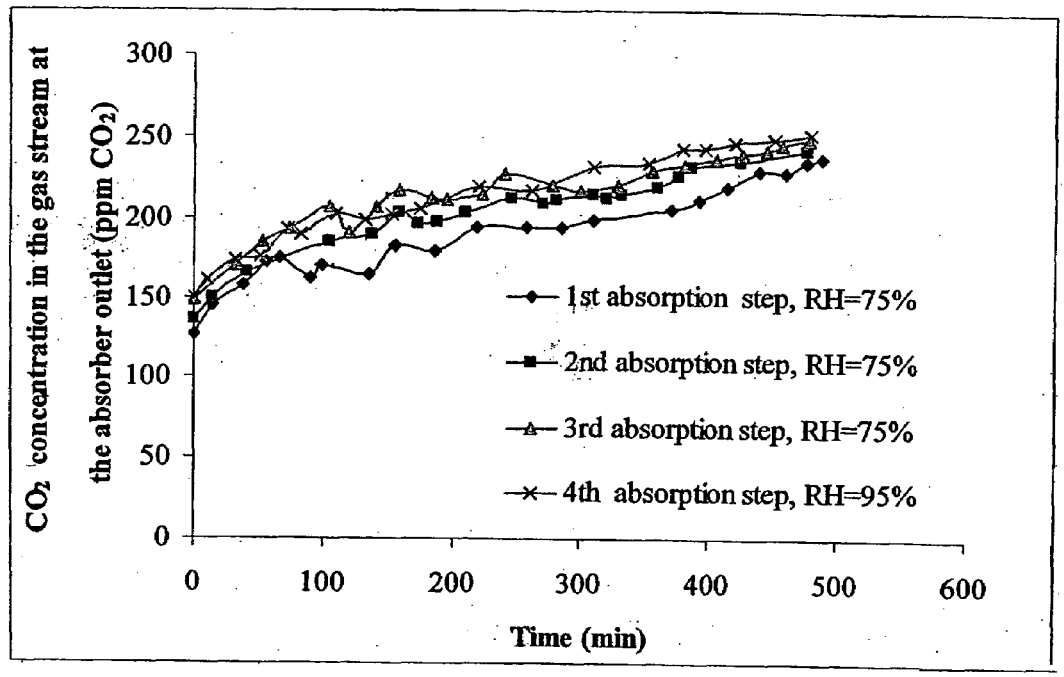
FIG. 6 is a plot of $CO_2$ concentration at an absorber outlet for successive absorption steps for a glycerol-containing absorbent solution according to an exemplary embodiment of the present disclosure.

The first three absorption steps were carried out using a feed gas having 75% relative humidity. A small improvement in the absorption capacity of the absorbent solution was observed when glycerol was added to the absorbent solution. The absorption behavior of successive absorption steps is plotted in FIG. 6. From these results, it is noted that there is a small difference in the amount of $CO_2$ separated from the feed stream between successive absorption steps. To overcome this performance differential demonstrated from absorption step to absorption step, the fourth absorption step was carried out with a feed stream having 95% relative humidity. The results of this fourth step are compared with the previous three absorption steps in FIG. 6. As shown therein, the absorption behavior of the fourth absorption step closely parallels the performance of the third absorption step over the course of the eight (8) hour experimental run. Based on these test results, through greater humidification of the feed stream, e.g., to 95% RH (as compared to 75% RH), the difference in $CO_2$ absorption performance between successive absorption steps may be addressed, at least in part.

Additional experiments were carried out with the same absorbent (i.e., an absorbent solution having 10 vol % glycerol; 20 vol % of water in glycerol carbonate having a total sodium glycinate concentration of 0.83 M) using 4 cc/min of feed gas (as compared to 8.3 cc/min), to further reduce the $CO_2$ concentration at the outlet. The effluent $CO_2$ concentration was initially 57 ppm and over the course of an extended experimental run (8 hours), the effluent $CO_2$ concentration slowly increased to 105 ppm. From these experimental results, it is evident that the $CO_2$ concentration of the feed can be reduced, e.g., to below 100 ppm, by altering/reducing the flow rate of the feed gas.

Figure 7:
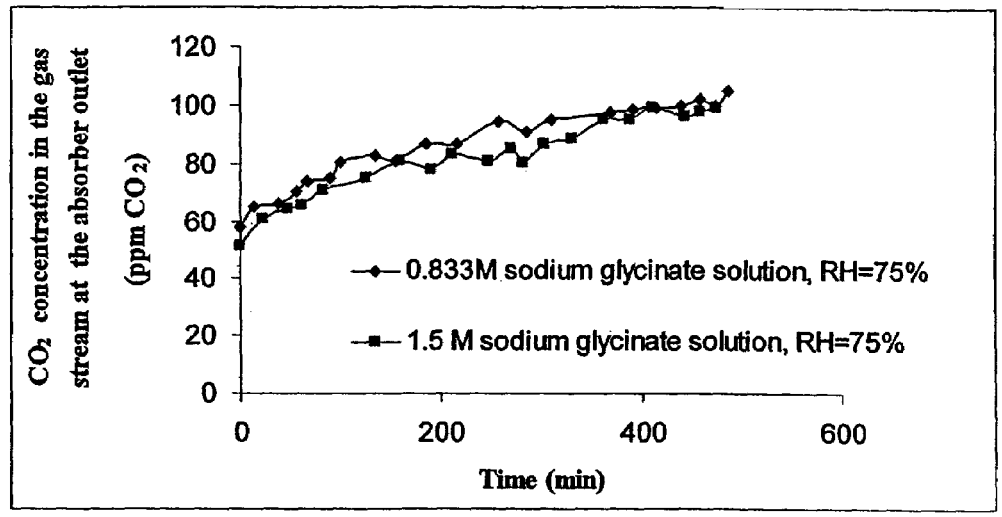
FIG. 7 is a plot of $CO_2$ concentration at an absorber outlet for 0.833 M and 1.5 M sodium glycinate absorbent solutions (feed gas flow rate of 4 cc/min) according to an exemplary embodiment of the present disclosure.

To determine whether absorption capacity may be increased through an increase in glycerol level, an absorption solution having 25% glycerol, 20% water in glycerol carbonate having a sodium glycinate concentration of 1.5 M, was prepared and tested. The absorption characteristics of this absorption solution is set forth in the plot of FIG. 7, and is compared with a comparable absorption solution having 0.833 M sodium glycinate. Only a small improvement in $CO_2$ absorption was observed when more glycerol, and hence more sodium glycinate, was added to the absorbent solution.

Of note, in performing the experiments described herein, approximate design calculations for the hollow fiber membrane module were carried out based on the fiber area required to achieve the desired level of $CO_2$ separation. Dimensions for a hollow fiber membrane module for use with an absorbent solution having 25% glycerol, 20% water in glycerol carbonate having sodium glycinate concentration of 1.5 M, were calculated to be 10" diameter and 20" length; however, an effort was made to reduce these dimensions while still achieving the desired performance levels. Accordingly, experiments were carried out with the aim of decreasing the module dimensions. Since pure glycerol generally dissolves substantially more sodium glycinate as compared to glycerol carbonate, even without the aid of water, a solution of 3 M sodium glycinate in glycerol was prepared and used.

Figure 8:
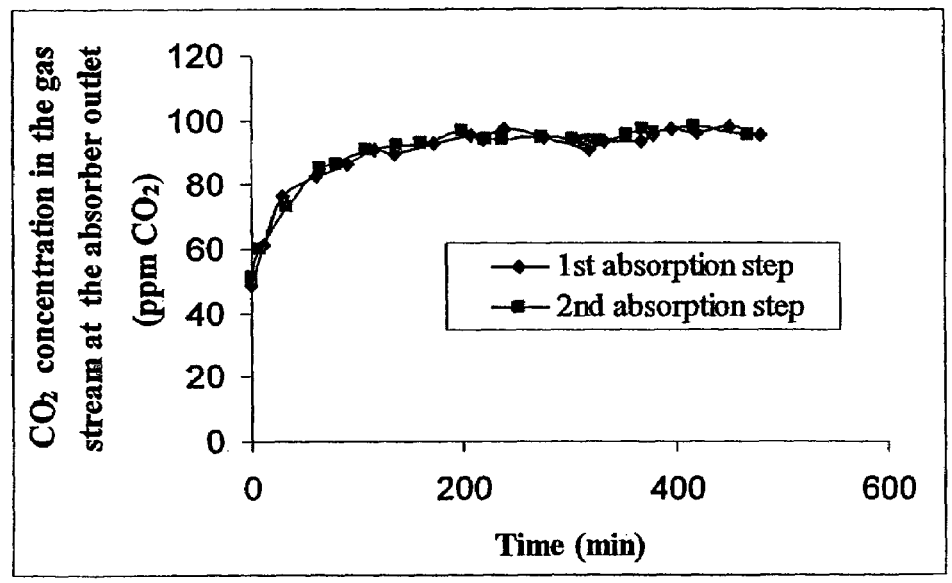
FIG. 8 is a plot of $CO_2$ concentration at an absorber outlet for successive absorption steps for 3 M sodium glycinate with a glycerol-based absorbent solution according to an exemplary embodiment of the present disclosure.

Absorption of $CO_2$ was carried out in a system that corresponds to that depicted in FIG. 1 with a solution of 3 M sodium glycinate in glycerol. The feed gas was characterized by a 75% relative humidity and contained 350 ppm $CO_2$ in nitrogen (balance). The experimental run extended for a period of eight (8) hours at a constant flow rate of 8.33 cc/min. Immediate desorption of $CO_2$ was carried out, during which $N_2$ gas was passed through the hollow fibers for a period of twelve (12) hours at a constant rate of 20 cc/min. After the desorption step, an additional absorption step was carried out. The absorption behavior for the second absorption step corresponded closely to the performance for the first absorption step, indicating that there is no loss in absorption behavior between successive absorption steps for the disclosed system. Absorption characteristics of the 3 M sodium glycinate solution in glycerol and comparison between the successive absorption steps are plotted in FIG. 8. It is apparent from these experiments that a solution of 3 M sodium glycinate in glycerol performs very well, and demonstrated superior performance relative to other absorbent solutions tested herein, e.g., a solution of 1.5 M sodium glycinate in glycerol carbonate, glycerol and water (5.5:2.5:2).

Hollow Fiber Module Design Calculations

According to the present disclosure, it is generally more effective to design the module based on the fiber area required to achieve the desired level of gas separation, rather than on the amount of absorbent solution needed to perform the task. Since the experimental data for 3 M sodium glycinate solution in glycerol as absorbent solution and feed gas flow rate of 8.33 cc/min achieves a desirable level of performance (i.e., effluent $CO_2$ concentration during the initial period was about 47 ppm and slowly increased to 97 ppm in a period of eight hours), exemplary module design calculations are provided herein based on the foregoing experimental data.

In the foregoing experimental run, 8.33 cc/min of feed gas having $CO_2$ at a concentration of 350 ppm was effectively treated in a module having forty (40) fibers of a length of seventeen (17) cm. Using a module of 18" (45.72 cm) length, the number of fibers required to treat $83.33*10^3$ cc/min (5000 lit/hr)=$(40*17*83.33*10^3)/(8.33*45.72)$=148,730. Using a packing fraction of fibers in the module as 0.5, a module of diameter 6.4" can accommodate 148,730 fibers. Therefore, a module of 6.4" diameter and 18" length having 148,730 fibers would be needed to achieve the required level of $CO_2$ separation according to the present disclosure.

To further decrease the module dimensions according to the present disclosure, the sodium glycinate concentration in glycerol can be increased, e.g., from 3 M to 4 M. Higher concentrations of carrier(s), e.g., acid salts, may be employed to further enhance system performance, subject to solubility restraints. An increased concentration of sodium glycinate would likely increase the gas flow rate that can be effectively treated by a module having 40 fibers/17 cm length from 8.33 cc/min to about 12.5 cc/min. Based on the foregoing, a module of 5" diameter and 18" length having 99,150 fibers should be sufficient to perform the required level of $CO_2$ separation at the increased sodium glycinate concentration. Further improvements and/or refinements in module design and/or sizing may be undertaken according to the present disclosure, e.g., by modifying the absorbent solution, as will be apparent to persons skilled in the art from the present disclosure. For example, solutions with higher absorption capacity can reduce the module dimension, e.g., to a 3-4" diameter range.

In sum, the experimental studies described herein demonstrate that the system and method of the present disclosure is effective to achieve desirable levels of gas separation/absorption for extended periods, without intervening regeneration or replacement of the absorbent solution. Based on the experimental results described herein, it is believed that a hollow fiber membrane module of 5" diameter and 18" length, fabricated with Celgard X-10 microporous, hydrophobic polypropylene hollow fibers, having 99,150 fibers and a shell side filled with an absorbent solution of 3-4 M sodium glycinate in glycerol should be sufficient to treat 5000 lit/hr of air of 75% relative humidity to reduce the $CO_2$ concentration from 350 ppm to 100 ppm for a period of eight (8) hours (without intervening regeneration or replacement of the absorbent solution). Regeneration of the absorbent solution or stripping of $CO_2$ from the absorbent solution may be accomplished by passing $N_2$ through the hollow fibers for a period of twelve (12) hours at a constant rate of 20 cc/min. Since the module design data was based on a feed gas of relative humidity 75%, the exemplary module disclosed herein should perform steadily when atmospheric air is treated.

In the experimental runs described herein, $N_2$ gas was used for the regeneration/desorption process. However, alternative sweep gases, e.g., hot air, are contemplated for use in regeneration of the absorbent solution after succeeding absorption step. Since exemplary absorbent solutions according to the present disclosure, e.g., 3 M sodium glycinate in glycerol, do not have added water (beyond the moisture absorbed from the air), the use of hot air should not pose an issue for desorption. Experimental runs to study the effects of hot air on the performance of the system and to model the flow rate, temperature specifications of hot air and time needed for regeneration, would further establish the efficacy of hot air for regeneration of absorbent solutions according to the present disclosure.

Although the systems and methods of the present disclosure have been described with reference to exemplary embodiments thereof, the present disclosure is not limited thereby. Indeed, the exemplary embodiments and implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention, which is defined by the claims appended hereto.

REFERENCES

1. Chen, H., et al., Selective $CO_2$ Separation from $CO_2$—$N_2$ Mixtures by Immobilized Carbonate—glycerol Membranes. *Ind. Eng. Chem. Res.* 1999, 38, 3489.
2. Meldon, J. H., et al; Facilitated Transport of Carbon Dioxide: A Review. *Chem. Eng. Commun.* 1982, 16, 263.
3. Way, J. D.; Noble, R. D., Facilitated Transport., *In Membrane Handbook*; Ho, W. S. W., et al., New York, 1992.
4. Ward, W. J., et al., Carbon Dioxide-Oxygen Separation: Facilitated Transport of Carbon Dioxide Across A Liquid Film, *Science* 1967, 156, 1481.
5. Otto, N. C., et al., The Facilitated Transport of Carbon Dioxide Through Bicarbonate Solutions, *Chem. Eng. Sci.*, 1971, 26, 949.
6. Suchdeo, S. R., et al., The Permeability of Gases Through Reacting Solutions: The Carbon Dioxide-Bicarbonate Membrane System, *Chem. Eng. Sci.*, 1974, 29, 13.
7. LeBlanc, O. H., et al., Facilitated Transport in Ion-Exchange Membranes, *J. Membr. Sci.* 1980, 6, 339.
8. Way, J. D., et al., Facilitated Transport of $CO_2$ In Ion Exchange Membranes, *AIChE J.* 1987, 33, 480.
9. Teramoto, M., et al., Facilitated Transport of Carbon Dioxide Through Supported Liquid Membrane of Aqueous Amine Solutions, *Ind. Eng. Chem. Res.*, 1996, 35, 538.
10. Guha, A. K., et al., Facilitated Transport of $CO_2$ Through An Immobilized Liquid Membrane of Aqueous Diethanolamine, *Ind. Eng. Chem. Res*,1990, 29, 2093.
11. Davis, R. A., et al., $CO_2/CH_4$ Separation by Facilitated Transport in Amine-Polyethylene Glycol Mixtures, *AIChE J.* 1993, 39, 1135.
12. Matsuyama, H., et al., Development of A New Functional Cation-Exchange Membrane and Its Application to Facilitated Transport of $CO_2$, *J. Membr. Sci.*, 1994, 93, 237.
13. Hughes, R. D., et al., Separation By Facilitated Transport Membranes, *In Recent Developments in Separation Science*, Li, N. N., et al. Eds., CRC Press, Boca Raton, Fla., 1986, Vol. IX.
14. Meldon, J. et al., Selective $CO_2$ Permeation in Immobilized Liquid Membranes, *AIChE Symp. Ser.* 1986, 248, 114.
15. Saha, S., et al., Selective $CO_2$ Separation from $CO_2$/$C_2H_6$ Mixtures by Immobilized Diethanolamine/PEG Membranes, J. Membr. Sci., 1995, 98, 157.
16. Astarita, G., et al., *Gas Treating with Chemical Solvents*, John Wiley & Sons, New York, 1983, p. 9.

17. Quartulli, O. J., et al., In *Encyclopedia of Chemical Processing and Design*, McKetta, J. J., Ed., Marcel Dekker, New York, 1977, Vol. 3, pp. 273-274.
18. Ho, W. S. W., Membranes Comprising Salts of Amino Acids in Hydrophilic Polymers, U.S. Pat. No. 5,611,843, 1997.
19. Segru, J. B., Oberstar, H. E., Viscosity of Glycerol and Its Aqueous Solutions, *Ind. Eng. Chem.*, 1951, 43, 2117.
20. Araki, K., Amino Acids, In *Encyclopedia of Chemical Technology*, 4$^{th}$ ed., Kroschwitz, J. I., et al., Eds., John Wiley & Sons, New York, 1992, Vol. 2, p. 504.
21. Jansen, A. E., et al., Method for Gas Absorption Across A Membrane, U.S. Pat. No. 5,749,941, 1995.
22. Jeffreys, G. V., et al., The Effect of Glycine Additive on the Rate of Absorption of Carbon Dioxide in Sodium Carbonate Solutions, *Trans. Inst. Chem. Eng.* 1964, 42, T118.
23. Chibowaki, E., et al., Theory and Practice of Thin-Layer Wicking, *Langmuir* 1993, 9, 330.
24. Bhave, R. R., et al., Gas Permeation by Aqueous Membranes Immobilized Across the Whole Thickness or In A Thin Section of the Hydrophobic Microporous Celgard Films, *J. Membr. Sci.*, 1986, 27 41.
25. Wise, D. L., et al., The Diffusion Coefficients of Ten Slightly Soluble Gases in Water at 10-60° C., *Chem. Eng. Sci.* 1966, 21, 999.
26. Perry, R. H., et al., Chemical Engineer's Handbook, 6$^{th}$ ed., McGraw-Hill Book Co., New York, 1984, Vol. 3, p. 103.
27. *Millipore Laboratory Catalogue*, Millipore: Bedford, Mass., 1997.
28. Calderbank, P. H., Physical Rate Processes in Industrial Fermentation, Part II Mass Transfer Cooefficients in Gas-Liquid Contacting With and Without Agitation, *Trans. Inst. Chem. Eng.* 1959, 37, 175.
29. Krulen, H., et al., Microporous Hollow Fibre Membrane Modules As Gas-Liquid Contactors, Part 1, Physical Mass Transfer Processes, A Specific Application: Mass Transfer 1N Highly Viscous Liquids, J. Membr. Sci. 1993, 78, 197.
30. Rischbieter, E., et al., Gas Solubilities in Aqueous Solutions, J. Chem. Eng. Data 1996, 41, 809.
31. Schumpe, A., The Estimation of Gas Solubilities in Salt Solutions, Chem. Eng. Sci., 1993, 48, 153.
32. Linden D., Reddy T. B. (Eds.), *Handbook of Batteries*, 3rd Ed. 2002.
33. Kusuki Y. et al., J. Membr. Sci. 111 (1996), p. 169-182.
34. Yosihiro K., Kaniji M., Toshimune Y., ICOM'90, p. 1025.
35. Mechaw S. I., Rogers M. E., Kim Y., McGrath J. E., Polymer Preprints, 34 (1993), p. 628.
36. H. J. Lehermeier, J. R. Dorgan, J. D. Way, J. Membr. Sci., 190 (2001), p. 243.
37. Yasuda H., Tsai J. T., J. Appl. Polym. Sci. 18 (1974), pp. 805-819.
38. Himmelblau D. M., Babb A. L., A. I. Ch. E. Journal. 4 (1958), p. 143-152.
39. Pohorechki R., Moniuk W., Chem. Eng. Sci. 43 (1988), p. 1677-1684.
40. Danckwerts P. V., Kennedy A. M., Chem. Eng. Sci., 8 (1958), p. 201-215.
41. Haar L., Gallagher J. S., Kell G. S., NBS/NRC Steam Tables, Hemisphere Publishing Corp., NY, 1984.
42. J. Balej. Int. J., Hydrogen Energy, 10 (1985), p. 234.
43. Icharuku Y., Stern S. A., Nakagawa T. J. J. Membr. Sci. 34 (1987), p. 5.
44. Nakagawa T., Nakano H., Hugichi A., 1st Membrane Symp. "Control in Membrane Transport," Kyoto, 1989, Book of Abstracts, p. 36.
45. R. W. Callahan. New Membrane Materials and Processes for Separation. AIChE Symposium Series 261 (1988), p. 54-63.
46. A. S. Kovvali, K. K. Sirkar, Ind. Eng. Chem. Res. 41 (2002) p. 2287.
47. H. Chen, G. Obuskovic, S. Majumdar, K. K. Sirkar, J. Membr. Sci. 183 (2001) p. 75.
48. A. S. Kovvali, Ph.D. Thesis Research, Unpublished, (2001).

The invention claimed is:

1. A method for separating a gas from a gaseous mixture, comprising:
   a. providing a hollow fiber membrane module containing a plurality of hollow fibers that define individual fiber lumens, said hollow fiber membrane module defining a region between said plurality of hollow fibers;
   b. providing an absorbent solution in said region defined within said hollow fiber membrane module;
   c. introducing a gaseous mixture to said hollow fiber membrane module and through said individual fiber lumens;
   d. absorbing at least one gas from said gaseous mixture by said absorbent solution so as to reduce the concentration of said at least one gas within said gaseous mixture to a reduced level, said absorption occurring for a period of time of at least about eight hours without regeneration or replacement of said absorbent solution.

2. A method according to claim 1, further comprising regenerating said absorbent solution by passing a sweep gas through said fiber lumens for a predetermined regeneration period.

3. A method according to claim 2, wherein said sweep gas is selected from the group consisting of air and nitrogen.

4. A method according to claim 2, wherein said regeneration of said absorbent solution is performed on a cyclic basis.

5. A method according to claim 1, wherein said absorbent solution is a hygroscopic nonvolatile solution.

6. A method according to claim 5, wherein said hygroscopic nonvolatile solution includes at least one chemically-reactive, reversible, non-volatile absorbent.

7. A method according to claim 5, wherein said absorbent solution includes glycerol, glycerol carbonate or a combination thereof.

8. A method according to claim 5, wherein said absorbent solution includes a carrier.

9. A method according to claim 8, wherein said carrier is selected from the group consisting of sodium glycinate, lithium glycinate and potassium glycinate.

10. A method according to claim 5, wherein said absorbent solution includes at least one dendrimer.

11. A method according to claim 5, wherein said absorbent solution is in the form of a suspension that includes water.

12. A method according to claim 1, wherein said hollow fibers are hydrophobic.

13. A method according to claim 7, wherein said hollow fibers are fabricated from microporous polypropylene.

14. A method according to claim 1, further comprising humidifying said gaseous mixture prior to introduction to said hollow fiber membrane module.

15. A method according to claim 1, further comprising heating said gaseous mixture prior to introduction to said hollow fiber membrane module.

16. A method according to claim 1, wherein said at least one gas that is absorbed from said gaseous mixture is carbon dioxide.

17. A method according to claim 1, wherein said period of time without regeneration or replacement of said absorbent solution is about eight hours.

18. A method according to claim 1, wherein said gaseous mixture is atmospheric air.

19. A method according to claim 1, wherein said absorption of said at least one gas from said gaseous mixture is undertaken in connection with a battery.

20. A method according to claim 1, wherein said absorption of said at least one gas from said gaseous mixture is undertaken in connection with a fuel cell.

21. A method according to claim 1, wherein said hollow fiber membrane module defines a longitudinal axis and wherein said plurality of hollow fibers are substantially aligned with said longitudinal axis.

22. A method according to claim 1, wherein said absorbent solution is provided so as to substantially eliminate air gaps from said region defined between said plurality of hollow fibers.

23. A method according to claim 1, wherein said absorbent solution remains in said hollow fiber membrane module and functions to absorb said at least one gas from said gaseous mixture in an uninterrupted manner throughout said period of time.

* * * * *